Aug. 8, 1967

G. H. GASS ETAL 3,334,614

ANIMAL CAGE FEEDING LID

Filed April 6, 1966

George H. Gass,
Charles A. Bunten,
Inventors,
Koenig, Senniger, Powers and Leavitt,
Attorneys.

United States Patent Office 3,334,614
Patented Aug. 8, 1967

3,334,614
ANIMAL CAGE FEEDING LID
George H. Gass and Charles A. Bunten, both of Carbondale, Ill., assignors to Southern Illinois University Foundation, Carbondale, Ill., a corporation of Illinois
Filed Apr. 6, 1966, Ser. No. 540,613
8 Claims. (Cl. 119—18)

This invention relates to lids for cages and more particularly to lids for cages used for housing small animals, such as mice.

Among the objects of the present invention may be noted the provision of a lid for an animal cage which incorporates devices for feeding and watering an encaged animal, and to such a cage lid which is virtually escape proof; the provision of a cage lid which is substantially free of edges, projections or other formations on its inner surface of the size and configuration which might constitute a place for animals (such as mice) to begin chewing a hole in the cage lid; the provision of a cage lid having a feeder for holding pellet size animal food which can be eaten through the feeder by an animal in the cage, the feeding arrangement being such that escape of the animal through the feeder is barred; the provision of a cage lid incorporating a watering device which may be actuated by an animal in the cage, and to such a cage lid wherein the actuator for opening and closing the watering device is located so that it does not become soiled when the lid is covering a cage bottom or when the lid is removed from a cage bottom and the watering device is resting on a flat supporting surface; the provision of a cage lid having a feeder and a watering device which will nest when a plurality of the lids are stacked; and the provision of an inexpensive cage lid incorporating animal feeding and watering devices which may be economically disposed of after a short period of use. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a plan view of a lid for an animal cage manufactured in accordance with one embodiment of this invention;

Corresponding reference characters indicate corresponding parts throughout the several views of the drawings.

Figure 1:
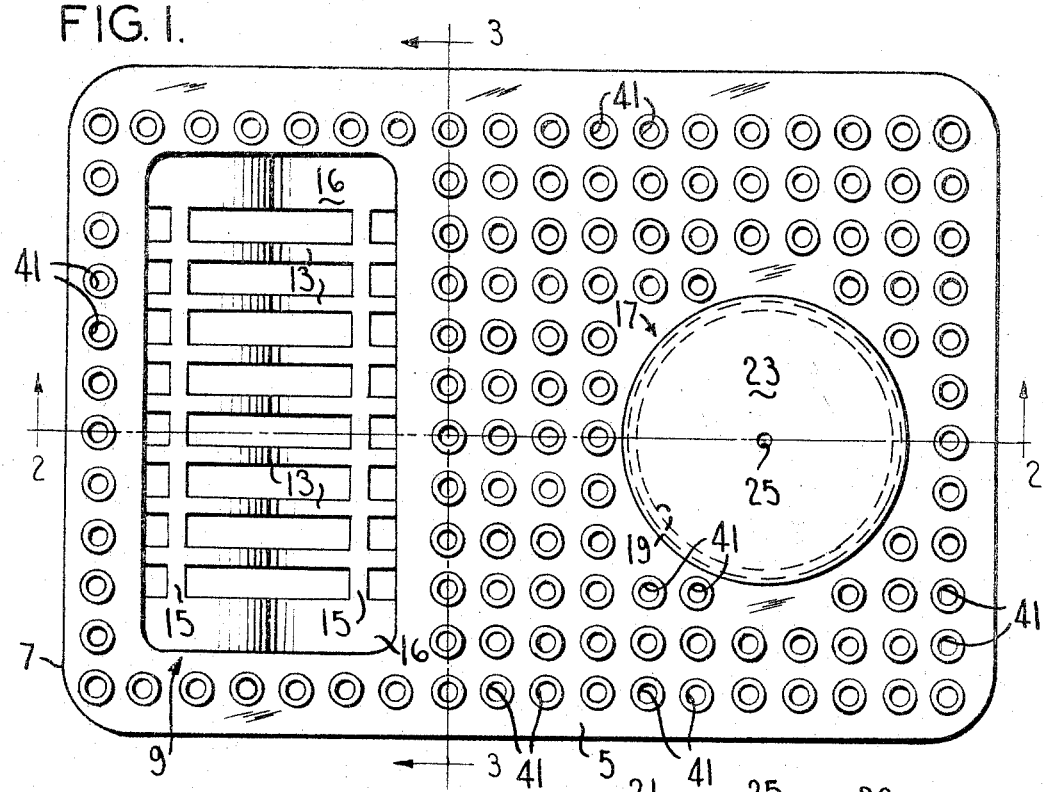

An animal cage lid of this invention is used for covering the open top cage bottom for small animals such as mice, hamsters or the like. The bottom part of the cage is illustrated in phantom at 1 in FIGS. 2–4 and it may be of various types including (but not limited to) the cage bottoms illustrated and described in the Shechmeister and Cohen U.S. Patent 3,122,127 for Animal Housing, dated Feb. 25, 1964. The cage bottom 1 illustrated in the drawings herein is generally rectangular in plan and has at its top a generally open rectangular edge portion designated 3.

Figure 2:
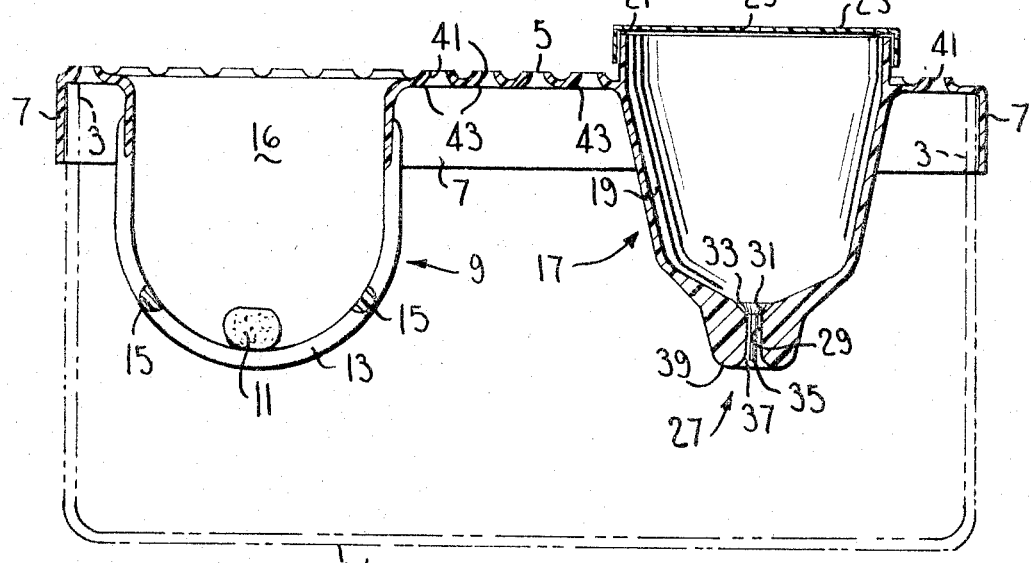
FIG. 2 is a longitudinal section taken along line 2—2 of FIG. 1.
Figure 3:
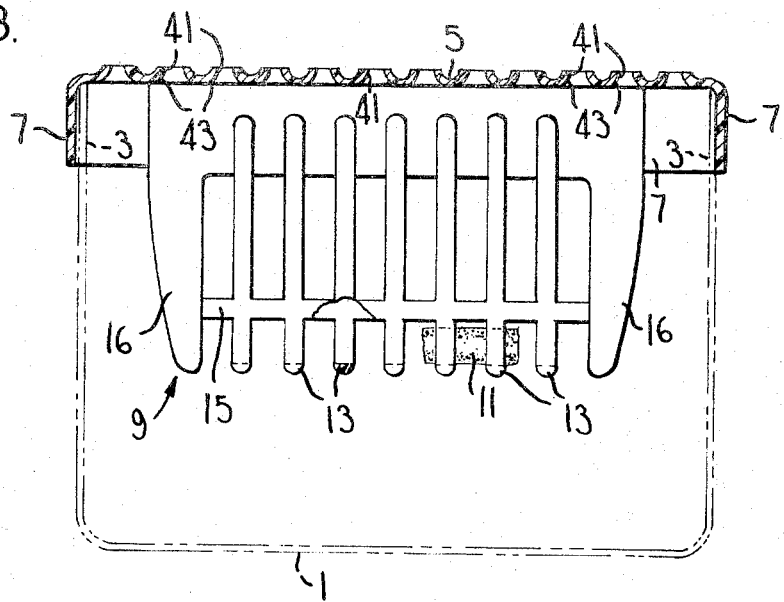
FIG. 3 is a transverse section taken along line 3—3 of FIG. 1.

Referring now to FIGS. 1–3, a lid of this invention is shown to comprise a generally flat, rectangular body portion 5 having a depending skirt 7 extending downwardly from its side edges and adapted to fit closely around the outside surface of the top edges 3 of cage bottom 1. Skirt 7 is preferably integrally formed with top 5.

Where disposability is desired, the lids of this invention may be manufactured from polystyrene, polypropylene, acrylonitrile-butadiene-styrene, polyethylene, acrylics, or other relatively inexpensive plastic materials so that the lid may be economically disposed of after a short period of use (e.g. 30 days or so). When a more or less permanent lid is desired, the lid may be manufactured from polycarbonate, melamine, phenolics, polyester-glass, and like plastic materials having good wear properties and capable of being cleaned and sterilized at high temperatures, such as are encountered in autoclaves. The lids may be manufactured by injection molding or by compression molding, depending upon the specific material being used. The thermoplastic materials are normally injection molded while the thermosetting materials are frequently compression molded.

The lid has a feeder generally designated 9 which is preferably integrally formed with the lid. Feeder 9 projects downwardly into the cage bottom portion 1 and it is adapted to receive pellets of animal food, one such pellet being shown at 11 in FIGS. 2 and 3. Feeder 9 comprises a plurality of equally spaced bars 13 located in generally parallel planes perpendicular to the plane of the upper surface of the lid. Bars 13 are preferably generally semicircular in cross section as shown in FIG. 3 with the rounded portion of the bars facing inwardly into the bottom part 1 of the cage. This circular configuration of the bars (as well as other portions of the lid) renders them very difficult (if not impossible) for a small animal such as a mouse to chew on. Therefore, this shape aids materially in preventing escape of the mice from the cage through the feeder by chewing through one or more of the bars.

As shown in FIG. 2, each of the bars 13 is generally circular from end-to-end so that the feeder can hold a large number of pellets 11 without taking an excessively large area of the surface of the lid. This permits the ventilating holes described later to constitute a major portion of the lid, thereby permitting desirable air flow through the holes for ventilating the cage. The large amount of air space provided by the spacing of bars 13 also aids air flow through the cage.

There are at least two reinforcing rods 15 joined to adjacent bars 13 for preventing an animal in cage bottom 1 from prying two of the bars 13 apart to escape from the cage. The reinforcing rods 15 may be integrally formed with the rods 13 and may be of the same semicircular cross section configuration as illustrated in FIG. 2. The rods 15 are joined to ends 16 of the feeder.

The feeder bars 13 are spaced apart a distance sufficiently small relative to the size of the pellets 11 to prevent the pellets from dropping through the feeder into the bottom part of the cage until they have been partially consumed. At the same time the bars 13 need to be spaced far enough apart so that the animal in the cage can reach between the bars for chewing on the pellets 11. Also the spacing should be such that the animal cannot escape between the bars. A desirable spacing for a commercially available food pellet for mice is about $\frac{3}{8}$ of an inch. With this spacing, mice do not appear to be able to make a purchase with their teeth and chew the plastic material of the rods and bars. Also, a food pellet does not fall through this size opening until it has been largely consumed.

The cage lid further comprises an integral watering device generally designated 3. The watering device 17 is shown in FIG. 2 to comprise a reservoir 19 having a circular opening 21 at its top, the opening 21 being slightly above the plane of the body portion 5 of the lid and constituting a filling opening. Reservoir 19 preferably has a capacity of at least 8 ounces of water and after it is filled through its open top, it may be closed by a cover 23. Cover 23 is preferably vented as shown at 25. Cover 23 prevents impurities from being inadvertently dropped into the water.

At the bottom of reservoir 19 there is a dispensing spout generally designated 27 which comprises a vertical hole 29 in the body of the reservoir. Around the top of hole 29 there is a frusto-conical valve seat 31. A valve 33 having a frusto-conical surface engages seat 31 for closing the spout 27 to the flow of water from reservoir 19. Valve 33 may be made of suitable materials including natural or synthetic rubber compounds containing silicon which prevents cracking of the material. Preferably, the valve is soft to insure good sealing contact with the surface of the seat 31.

A valve stem 35 projects from the lower end of valve 33 into the center part of hole 29. When valve 33 engages seat 31, the lower end of valve stem 35 is located in an enlarged lower portion 37 of hole 29 above the bottom edge or lip 39 of reservoir 19. The size of the end 37 of hole 29 is such that an animal in cage bottom 1 can obtain a drink of water from reservoir 19 by pushing upwardly against the lower end of stem 35 with its tongue or mouth. This causes the valve 33 to move upwardly away from its seat 31 and permits water to flow between the seat and valve, through hole 29 and into the mouth of the animal. When the animal in the cage has had its drink and releases the valve stem 35, gravity and the weight of water in the reservoir 19 pressing against the flat upper surface of valve 33 forces the valve back against seat 31 to close the reservoir from further flow of water.

The reservoir 19 is spaced from the feeder 9 and preferably both project downwardly into the bottom 1 of the cage substantially the same distance. Upon removal from a cage bottom, the lid is adapted to rest on a flat surface (such as a laboratory table top) without tilting and spilling water from reservoir 19 and food pellets from feeder 9. By having the lower end of valve stem 35 recessed in hole 29 as previously described, the lower end of the stem does not become soiled or contaminated when the lid is resting on a flat surface. The bottom of the feeding device and the watering device are spaced above the bottom of the cage so that neither is soiled by contact with the bottom of the cage.

The cage lid has a plurality of spaced ventilating openings 41 located in the body portion 5 of the lid. It is preferred that a large number of the openings 41 be provided to increase the area available for air to be exchanged with the interior of the cage. The inner surface of the cage lid bounding the openings 41 is designated 43 and, as best illustrated in FIG. 2, these surfaces flare upwardly and outwardly away from the cage bottom 1 to form generally concave surfaces facing into the animal cage. This particular shape is preferred since there are no sharp edges or projections inside of the cage lid around the openings 41 which could provide a starting point for an encaged mouse or other animal to chew on or through. Holes 41 may also be elongate slot-like holes as shown in the aforementioned patent to Shechmeister and Cohen.

Figure 4:
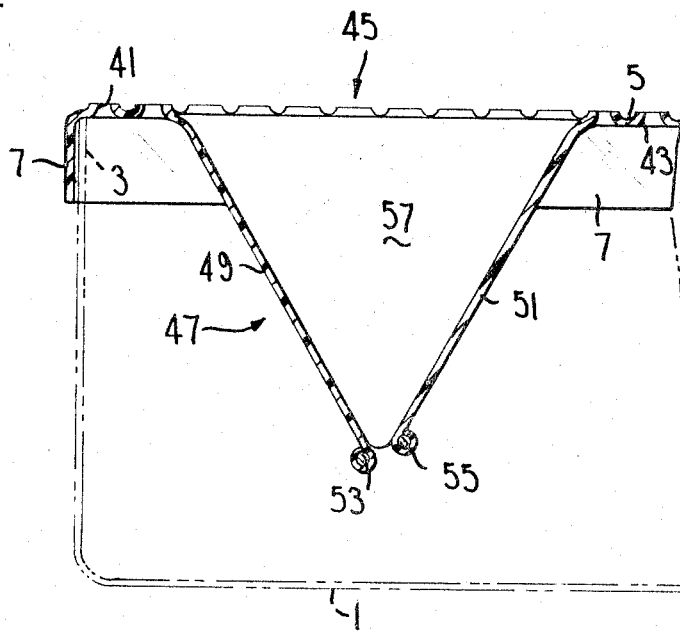
FIG. 4 is a fragmentary longitudinal section similar to FIG. 2 showing a modified construction for the cage lid of the invention.

A modified form of the cage lid is illustrated in FIG. 4 of the drawings. In this instance the cage lid has a feeder generally designated 45 which comprises an elongate and generally V-shaped trough 47 having tapered walls 49 and 51. Walls 49 and 51 are integrally joined to the upper body portion 5 of the cage lid by smooth arcs as illustrated in FIG. 4 and they terminate at their lower ends in reinforcing bars 53 and 55 of circular cross section. The bar 53 may be somewhat lower in the cage than the bar 55 as illustrated in FIG. 4.

The rigidity of the lower end of the walls 49 and 51 due to the bars 53 and 55 effectively prevents a mouse from prying the walls 49 and 51 apart at their lower or mouth end and escaping from the cage. The sides 49 and 51 of the trough 47 are attached at their ends to triangular plates 57 which prevents escape of an animal through the ends of the trough and prevents food pellets from dropping into the cage through the ends of the trough.

The reinforcing bars 53 and 55 are spaced apart a distance sufficiently wide to permit the encaged animal to reach between them for chewing on a pellet of food or the like but they are sufficiently close together to prevent the pellet from dropping between them until it is partially consumed.

Except for feeder 47, the cage lid shown in FIG. 4 may be the same as the FIGS. 1–3 lid.

Figure 5:
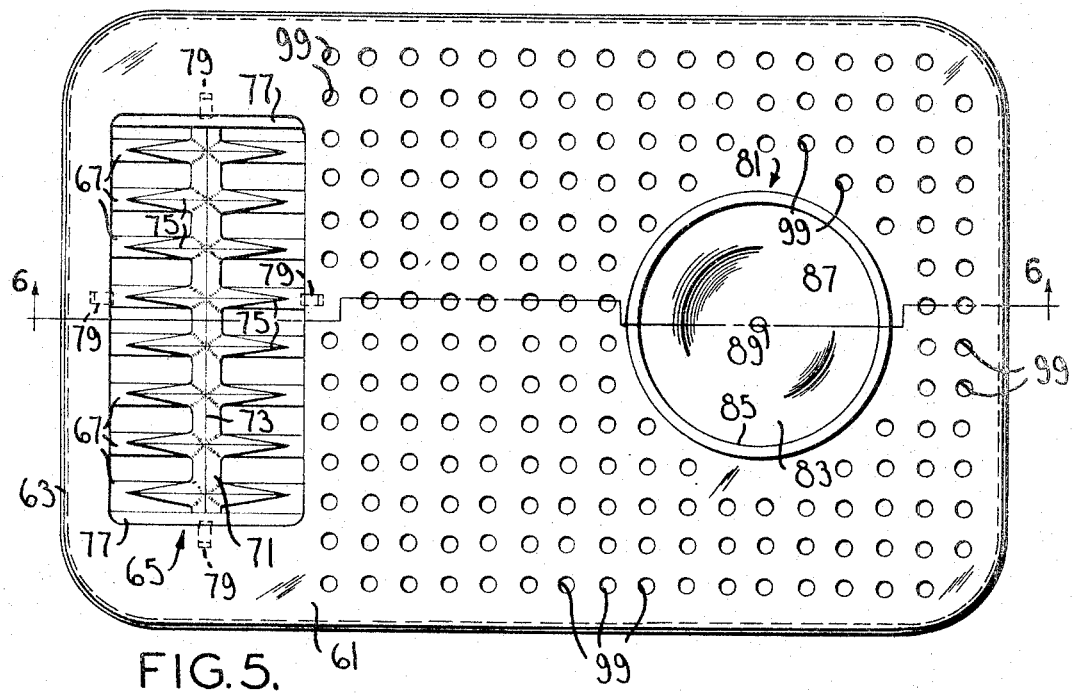
FIG. 5 is a plan view of another embodiment.
Figure 6:
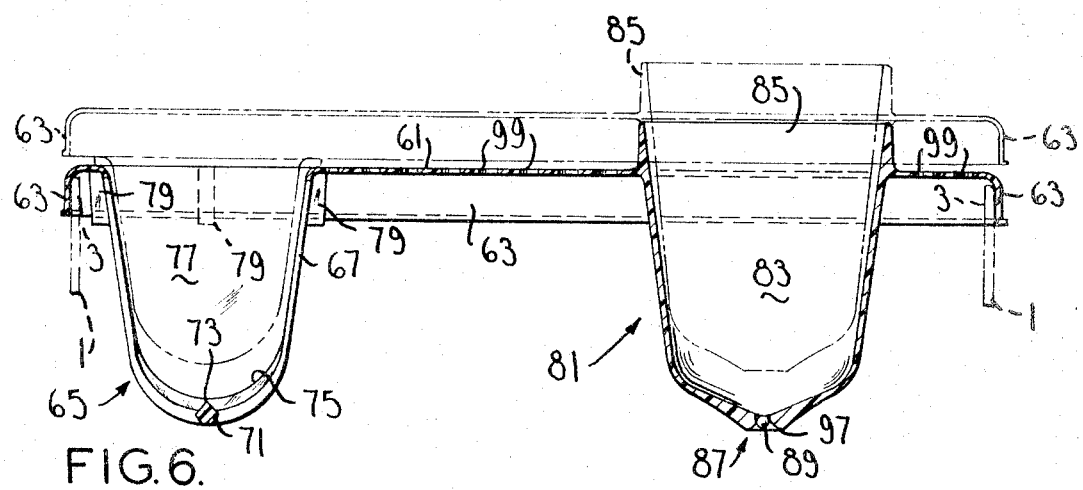
FIG. 6 is a section taken along line 6—6 of FIG. 5.
Figures 7, 8:
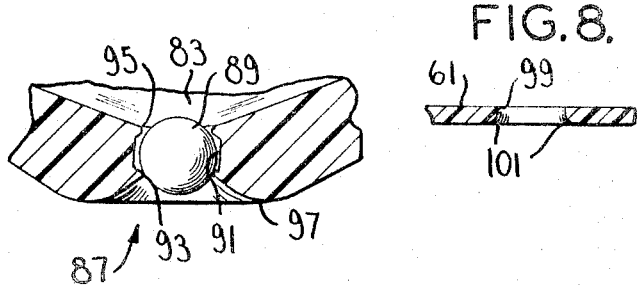
FIGS. 7 and 8 are enlarged sections showing details of the FIGS. 5 and 6 cage lid.

FIGS. 5–7 illustrate another embodiment of the cage lid of the invention. The lid of this embodiment comprises a body portion 61 having an open, rectangular skirt portion 63 depending from its outer edge or periphery. Skirt 63 fits around the upper edge portion 3 of the bottom part of cage bottom as illustrated in part in phantom in FIG. 6.

At one end portion of the lid there is an integral feeder generally designated 65. Feeder 65 comprises a plurality of longitudinally spaced bars 67 which are integrally formed with wall 61. The ends of the bars are at opposite sides of an opening 69 in the wall. The lower center portion of bars 67 are joined by a reinforcing rod 71 which has a lower portion of semi-circular cross section facing into the cage bottom and side walls rising to a peak 73 inside the feeder. Bars 67 are also generally semicircular in cross section on the side facing into the cage bottom and have side walls rising to a peak 75 inside the feeder. Thus the lower portion of each bar 67 has substantially the same cross section shape shown for the rod 71 in FIG. 6. The surfaces of the bars 67 and rod 71 exposed to animals inside the cage are rounded and cannot be chewed by mice, etc. The peaks 73 and 75 deflect food pellets 11 in the feeder into the slots or spaces between longitudinally adjacent bars 67. Ends of the feeder are closed by walls 77 which slope inwardly from the top to the bottom of the feeder. Also each bar 67 is inclined inwardly from the top to the lower portion of the feeder. With this feeder construction, the top of the feeder is substantially wider than the lower portions of the feeder. This permits stacking of a plurality of the lids one above the other as shown in solid and phantom lines in FIG. 6 with one feeder nesting deep inside the next lower feeder in the stack.

At each side of feeder 65 there is a stacking rib 79. The ribs 79 project downwardly slightly below the lower edge of skirt 63 as shown in FIG. 6. Thus when a plurality of the feeders are stacked one above the other the lower edges of the stacking ribs of an upper lid in the stack engage the upper surface of the next lower lid.

At the end portion of the lid opposite from the feeder there is a watering device generally designated 81. The watering device includes a reservoir 83 which is filled with water through its open top. Wall 85 of the reservoir projects above the plane of body portion 61 by a distance substantially equal to the length of the stacking ribs 79. The inner surface of wall 85 tapers from its open upper end to the bottom of the reservoir so that in stacking the lids the watering device of an upper lid of the stack is easily nested deep in the reservoir portion of the next lower lid in the stack. The upper edge of wall 85 of a lower lid in a stack of lids engages the lower surface of the next upper lid in the stack. Thus the upwardly projecting walls 85 and ribs 79 support the lids when they are stacked and skirts 63 are free of the weight of the other lids.

As shown in FIG. 7, the watering device has a valved dispensing spout 87 at the lower end of the reservoir which comprises a ball or sphere 89 positioned in a hole 91 in the bottom of the watering device. An annular knife-edge valve seat 93 projects radially inwardly from the lower end of hole 91. When seat 93 is engaged by ball 89 water cannot pass from reservoir 93 into the cage.

At the upper end of hole 91 there is an annular ball retainer 95 which prevents upward movement of ball 89 from the hole into the reservoir 83 during normal operation of the spout. As will be apparent from FIG. 7 the retainer 95 is spaced a sufficiently large distance from the seat 93 so that ball 89 can be moved upwardly away from the seat without engaging the retainer. Thus when a mouse or other animal in cage bottom 1 engages ball 89 with its nose or tongue, the ball moves upwardly away from seat 93 and water flows from reservoir 83 past the retainer 95, around the ball and through hole 91, and then past seat 93 into the mouth of the animal.

Seat 93 is disposed within a concave recess positioned upwardly from the lowermost edge portion 97 of the watering device. This permits the lower end of the watering device to rest on a flat table top without unseating ball 89 and draining water from reservoir 83. The annular edge 97 at the bottom of the watering device is substantially in the same plane as the bottom of the feeder 65. Because of this, the body 61 and these bottoms are substantially parallel when the lid is sitting on a flat surface. The lower edge 97 is rounded with a relatively large radius or curvature so that it is virtually impossible for an animal to chew through the watering device at this rounded edge.

Body portion 61 is provided with a plurality of small holes or openings 99 through it from top to bottom for ventilating the bottom of the cage. The inner edges of the holes are rounded as shown at 101 in FIG. 8 to minimize chewing by an encaged animal. The diameter of the holes is sufficiently small (preferably about ¼") that the encaged animal cannot project its mouth or jaw through the holes to begin chewing on the lid at the holes. The holes 99 are arranged in longitudinal and transverse rows throughout substantially the entire portion of body portion 61 except where the feeder 65 and watering device 81 are located.

In using any of the cage lids of the invention, the lid is placed over the upper edges 3 of a generally rectangular cage bottom containing mice or other animals. Food pellets 11 are then placed into the feeder 9 (47 or 65) and water is poured into the reservoir of the watering device. Filling of the feeders and reservoir may, of course, be accomplished while the cage lid is resting on a supporting surface (such as a laboratory table top) due to the fact that the respective bottoms of the feeding devices and the watering devices in each of the various embodiments are located in substantially the same horizontal plane, thereby permitting water to be placed in the reservoir 19 when the lid is on the table top without spillage occurring.

When the lid is in place over the bottom part 1 of the cage, the animal in the cage cannot escape through the lid since all portions of the cage lid which face into the cage bottom part 1 are entirely free of edges or other projections which are of a configuration or size that could be chewed by animals in the cage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lid for covering an open-top cage bottom for housing small animals such as mice and the like, the lid having a depending skirt at its periphery adapted to fit around the top edges of the cage bottom, an integral feeder projecting downwardly for reception by the cage bottom, the feeder being adapted to receive pellets of animal food and having along its lower part at least one opening sized relative to the pellets to prevent their dropping through the feeder until they have been partially consumed, said opening being sufficiently wide to permit an animal housed in the cage bottom to eat food pellets in the feeder through the opening, an integral watering device projecting downwardly for reception by the cage bottom, the watering device having a filling opening at the top and having a valved dispensing spout at the bottom adapted to be opened when contacted by the mouth of an animal in the cage bottom, and a plurality of ventilating openings, the lid being free of edges or projections of a size and configuration which could be chewed by animals in the cage bottom, the feeder further comprising a plurality of spaced bars located in generally parallel planes, and at least one reinforcing rod connecting adjacent bars of the feeder intermediate the ends of said bars for preventing an animal in the cage bottom from prying two of the bars apart to escape from the cage.

2. A cage lid as set forth in claim 1 wherein the watering device comprises a reservoir adapted to be filled with water through the filling opening, a valve seat in a lower portion of the reservoir, and a ball adapted to engage said seat for closing said spout to the flow of water, the ball being engageable by the mouth of an animal in the cage bottom to unseat said ball for dispensing water from the spout.

3. A cage lid as set forth in claim 1 wherein the watering device comprises a reservoir adapted to be filled with water through the filling opening, a vented cover for the filling opening, a frusto-conical valve seat in a lower portion of the reservoir surrounding said dispensing spout, a tapered valve adapted to engage said seat for closing said spout to the flow of water, and a valve stem projecting from said valve through said spout, the lower end of the valve stem being engageable by the mouth of an animal in the cage bottom to unseat said valve for dispensing water from the spout.

4. A cage lid as set forth in claim 1 wherein the ventilating openings are small circular openings, and the portions of the cage lid bounding the openings are smooth and rounded whereby an animal in the cage bottom is unable to chew the lid around said ventilating openings.

5. A lid for covering an open-top cage bottom for housing small animals such as mice and the like, the lid having a skirt at its periphery for fitting the lid on the top of the cage bottom, an integral feeder projecting downwardly for reception by the cage bottom, the feeder being adapted to hold pellets of animal food, the feeder comprising a plurality of spaced bars located in generally parallel planes and adapted to hold food pellets until they have been partially consumed, the spacing of the bars being sufficiently wide to permit an animal in the cage bottom to eat food pellets held in the feeder between the bars, at least one reinforcing rod connecting adjacent bars of the feeder intermediate the ends of said bars to prevent spreading of the bars by an animal in the cage, and the lid further comprising a valved watering device for an animal in the cage bottom, the lid having a plurality of ventilating openings, and the lid being free of edges or projections of a size and configuration which could be chewed by animals in the cage bottom.

6. A lid as set forth in claim 5 wherein both the feeder and the watering devices are inclined inwardly from the top to the bottom whereby the lid can be stacked on another similar lid with the feeder and watering devices nested.

7. A lid as set forth in claim 6 further comprising a stacking rib projecting from the wall portion of the lid.

8. A lid for covering an open-top cage bottom for housing small animals such as mice and the like, the lid having a skirt at its periphery for fitting the lid on the top of the cage bottom, an integral trough-shaped feeder projecting downwardly for reception by the cage bottom, the feeder being adapted to hold pellets of animal food and having along its bottom a single slot-like opening sized relative to the pellets to prevent their dropping through the feeder until they have been partially consumed, the edges of the opening being bounded by separate reinforcing bars of circular cross section to prevent an animal in the cage from widening the opening to escape from the cage, the feeder opening being sufficiently wide to permit an animal in the cage bottom to eat food pellets held in the feeder through the opening, the lid having a valved watering device for providing water to an animal in the cage bottom, the lid having a plurality of ventilating openings, and the lid being free of edges or projections of a size and configuration which could be chewed by animals in the cage bottom.

References Cited

UNITED STATES PATENTS

| | | | |
|---|---|---|---|
| 2,467,525 | 4/1949 | Fricke | 119—15 |
| 2,726,636 | 12/1955 | Frederiksen | 119—72.5 |
| 3,122,127 | 2/1964 | Shechmeister et al. | 119—18 |
| 3,212,474 | 10/1965 | Higgins et al. | 119—18 |
| 3,215,119 | 11/1965 | Graham | 119—75 |
| 3,256,859 | 6/1966 | Petit | 119—18 |

SAMUEL KOREN, *Primary Examiner.*

HUGH R. CHAMBLEE, *Examiner.*